United States Patent
Alakoye et al.

(10) Patent No.: US 10,824,670 B2
(45) Date of Patent: Nov. 3, 2020

(54) REAL-TIME AUDIO STREAM SEARCH AND PRESENTATION SYSTEM

(71) Applicant: nedl.com, Inc., Santa Monica, CA (US)

(72) Inventors: Ayinde Alakoye, Santa Monica, CA (US); Jason Medeiros, Cypress, CA (US)

(73) Assignee: nedl.com, Inc., Santa Monica, CA (US)

( * ) Notice: Subject to any disclaimer, the term of this patent is extended or adjusted under 35 U.S.C. 154(b) by 0 days.

(21) Appl. No.: 16/361,319

(22) Filed: Mar. 22, 2019

(65) Prior Publication Data

US 2019/0294630 A1 Sep. 26, 2019

Related U.S. Application Data

(60) Provisional application No. 62/647,597, filed on Mar. 23, 2018, provisional application No. 62/694,951, filed on Jul. 6, 2018.

(51) Int. Cl.
*G06F 16/683* (2019.01)
*G06F 16/635* (2019.01)
*G10L 15/26* (2006.01)

(52) U.S. Cl.
CPC .......... *G06F 16/685* (2019.01); *G06F 16/635* (2019.01); *G10L 15/26* (2013.01)

(58) Field of Classification Search
None
See application file for complete search history.

(56) References Cited

U.S. PATENT DOCUMENTS

| | | | |
|---|---|---|---|
| 7,787,973 B2 | 8/2010 | Lambert | |
| 8,843,467 B2 | 9/2014 | Messer et al. | |
| 9,384,509 B2 | 7/2016 | Boulter et al. | |
| 2008/0033986 A1* | 2/2008 | McCusker | G06F 16/68 |
| 2008/0072256 A1 | 3/2008 | Boicey et al. | |
| 2008/0307463 A1 | 12/2008 | Beetcher et al. | |
| 2011/0093100 A1* | 4/2011 | Ramsay | G06F 3/011 |
| | | | 700/94 |
| 2012/0131060 A1* | 5/2012 | Heidasch | G10L 15/1822 |
| | | | 707/794 |
| 2012/0239661 A1* | 9/2012 | Giblin | H04L 65/403 |
| | | | 707/741 |
| 2013/0066633 A1* | 3/2013 | Krishnan | G06F 16/955 |
| | | | 704/270.1 |
| 2016/0048589 A1 | 2/2016 | Modi | |
| 2018/0248929 A1* | 8/2018 | Han | H04W 88/02 |

* cited by examiner

*Primary Examiner* — Christopher J Raab
(74) *Attorney, Agent, or Firm* — Fox Rothschild LLP (57) ABSTRACT

A digital media search and presentation service will receive audio streams from multiple audio content sources and capture text segments, each of which corresponds to words in a snippet of the audio stream. When a client device receives a search request, the service will identify text segments that correspond to the search request. The service will select one or more of the text segments as candidate search results. The service will cause the client device to output user-selectable fields, each of which includes information corresponding to the selected text segments in a user-selectable interface by which a user may select the audio content sources for each of the text segments. When a user selects one of the fields, a media player of the client device will access and play audio content that the audio content source is transmitting at the time.

21 Claims, 9 Drawing Sheets

REAL-TIME AUDIO STREAM SEARCH AND PRESENTATION SYSTEM

CROSS-REFERENCE TO RELATED APPLICATIONS

This application claims the benefit under 35 U.S.C. § 119(e) of, and priority to: (i) U.S. Provisional Application No. 62/647,597 filed on Mar. 23, 2018; and (ii) U.S. Provisional Application No. 62/694,951, filed on Jul. 6, 2018, The disclosure and content of each priority application are fully incorporated into this document.

BACKGROUND

Digital audio streaming has become one of the most popular ways for audiences to consume audio content in the modern world. Almost every over-the-air live broadcaster also has an Internet feed or software application by which consumers all over the world can listen to the broadcast station via the Internet. In addition, the rise of streaming has spawned countless Internet-only broadcasters who do not have over-the-air transmissions but who make their broadcasts available only via a digital stream. Even conventional broadcasting services, such as satellite radio, have added "digital-only" channels that stream audio of a variety of genres all over the nation and the world.

Broadcasting services typically give a user the option to choose from a wide variety of broadcasting stations. Based on this wide variety of broadcasting stations, it can be time consuming for a user to browse through the broadcasting stations in an attempt to find a specific topic being discussed, or a song or an artist that is being played at that present time. Additionally, it is currently difficult for a user to search the wide universe of broadcasting stations for a specific topic, artist or song.

This document describes a real-time live digital audio stream searching and presentation system that is directed to solving the issues described above, and/or other issues.

SUMMARY

In various embodiments a digital media search and presentation service will receive audio streams from multiple audio content sources. From each of the audio streams, the service will capture a text segment that corresponds to a snippet of its corresponding audio stream and that includes words spoken or sung in the snippet. The service will save each text segment to a data store of real-time content. When the service receives a signal indicating that a client device has received a search request with one or more keywords, the service will access the data store of real-time content to identify text segments that include one or more words that correspond to the one or more keywords. The service will select one or more of the text segments as candidate search results. The service will cause the client device to output one or more user-selectable fields, each of which includes information corresponding to each of the selected text segments in a user-selectable interface by which the user may select the audio content sources for each of the selected text segments. When the client device receives a selection of one of the user-selectable fields, then in response the client device will cause a media player to access the audio content source, and the client device will and cause an audio output of the client device to play audio content that the audio content source is transmitting at the time of the accessing.

In various embodiments, capturing a text segment from an audio stream may include receiving the audio stream, processing the snippet of the audio stream with a speech-to-text converter, and saving output from the speech-to-text converter as the text segment. Optionally, the service may continue to capture, from each of the audio streams, a new text segment, each of which corresponds to a new snippet of its corresponding audio stream. If so, then for each of the audio streams, the system may save each new text segment to the data store of real-time content and, when doing so, delete one or more previously-saved text segments for the audio stream.

In various embodiment, the service may receive the audio streams from audio content sources that include a digital streaming source via a communication network and/or an over-the-air broadcasting source.

In various embodiments, receiving the selection of one of the user-selectable fields may include detecting a touch, a spoken word, or a gesture of a user of the client device. In addition or alternatively, the service may detect that a user of the client device has requested a random selection, and if so it may apply a randomization function to randomly select one of the user-selectable field. Optionally, detecting that the user of the client device has requested a random selection may include receiving a signal from a motion sensor of the client device indicating that the client device has been spun by at least a threshold speed.

In various embodiments, when selecting one or more of the text segments as candidate search results, the service may rank the text segments by relevance based on one or more of the following: (i) recency of time at which the one or more words that correspond to the one or more keywords were received in the audio stream to which the text segment corresponds; (ii) a number of times in which a component of the search request appears in the text segment; (iii) a prominence in the text segment of component of the search request; (iv) geographic proximity of the audio content source from which the text segment was derived to the client device; and/or (v) characteristics of the audio content source corresponding to user profile data for a user of the client device. If so, the service may cause the client device, when outputting the one or more user-selectable fields, to order the user-selectable fields according to the ranking of the text segments that correspond to the user-selectable fields.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." When used in this document, the term "exemplary" is intended to mean "by way of example" and is not intended to indicate that a particular exemplary item is preferred or required.

Other terms that are relevant to this disclosure will be defined at the end of this Detailed Description.

Figure 1:
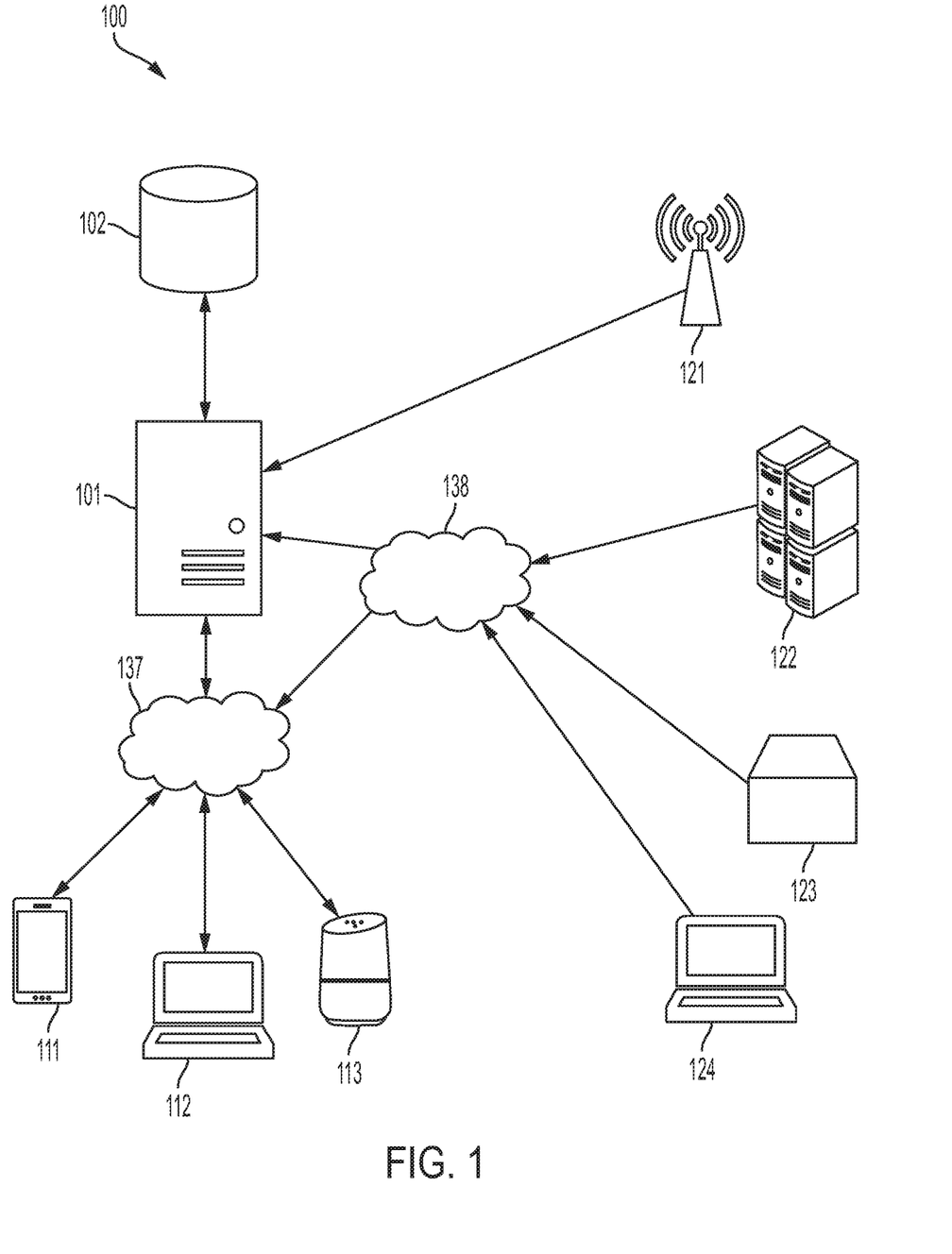
FIG. 1 is a block diagram that shows various devices and systems that may interact with a digital audio stream search and presentation system.

FIG. 1 provides an overview of various elements that may be included in the real-time live digital audio stream search and presentation system 100 described in this document. A digital media search and presentation service 101 will include communications hardware that enables it to receive audio streams from multiple audio content sources. For example, the service 101 may include an antenna and receiver that are capable of receiving broadcasts from over-the-air radio and/or television stations 121. In addition or alternatively, the service 101 also may include an Ethernet, Wi-Fi or other connection that connects the service to a communication network 138 via which it may receive streams from external content providers such as: (i) digital broadcasting services such as satellite radio services or digital radio or television channels 122; (ii) Internet media delivery services such as streaming music and/or video services, social media services or podcast services 123; and/or (iii) individuals who are uploading digital audio and/or video streams to the Internet via personal electronic devices 124. The service also may receive and use audio streams that originate from within the service itself, or from an affiliate of the service. At least some of the digital audio streams may be live streams, although it is possible that some or all of the streams may be on-demand or pre-recorded streams. (As used in this document, the terms "audio stream" and "audio content" may include transmissions that consist purely of audio content, as well as transmissions that include audio and other content such as an audio track with video and/or data tracks.

The digital media search and presentation service 101 may include an Ethernet, Wi-Fi or other connection that connects the service to a communication network 138 via which it may receive requests from, and provide responses to, any number of client electronic devices. Each client device will include: a processor; a user interface; a speaker, audio port and/or near-field transmitter for audio output; and communications hardware for communicating with the digital media search and presentation service 101 via the communication network 138. The client electronic devices may include, for example: smartphones 111; tablet, laptop or desktop computers 112; and/or Internet-connected audio presentation devices such as media players and digital home assistants 113. The client electronic devices will include software applications that enable the device to send requests to, and receive responses from, the digital media search and presentation service 101. The client electronic devices also will include a browser or other software application that enables the device to receive digital audio streams from audio content sources (such as 122 and 123) by pointing the browser or other application to an address at which the stream is hosted. Optionally, the client electronic devices also will include an antenna and software that enable the device to receive over-the-air broadcasts from over-the-air broadcast sources 121.

The digital media search and presentation service 101 will include a processor, and it will include or be communicatively connected to a memory containing programming instructions that are configured to cause the service's processor to perform some or all of the functions described in this document. The service 101 is not limited to a single processor and a single location; in various embodiments the service 101 may be implemented by multiple geographically-distributed servers to help reduce communication latency between client devices and the service, regardless of client device location. The digital media search and presentation service 101 will include or be connected to a data store 102 in which it stores information that is required to access and receive content from to digital audio sources, such as application programming interfaces (APIs) for various audio services, uniform reference locators (URLs) or other digital coordinates at which digital audio sources make streams available, and frequencies of over-the-air broadcasters.

Notably, in the embodiments discussed in this document the media search and presentation service 101 will not need to record or store recordings (such as digital audio files) of audio content that it receives from the digital audio sources. However, the invention is not necessarily limited to such an embodiment, as it is contemplated that the service could store content in alternate embodiments.

Figure 2:
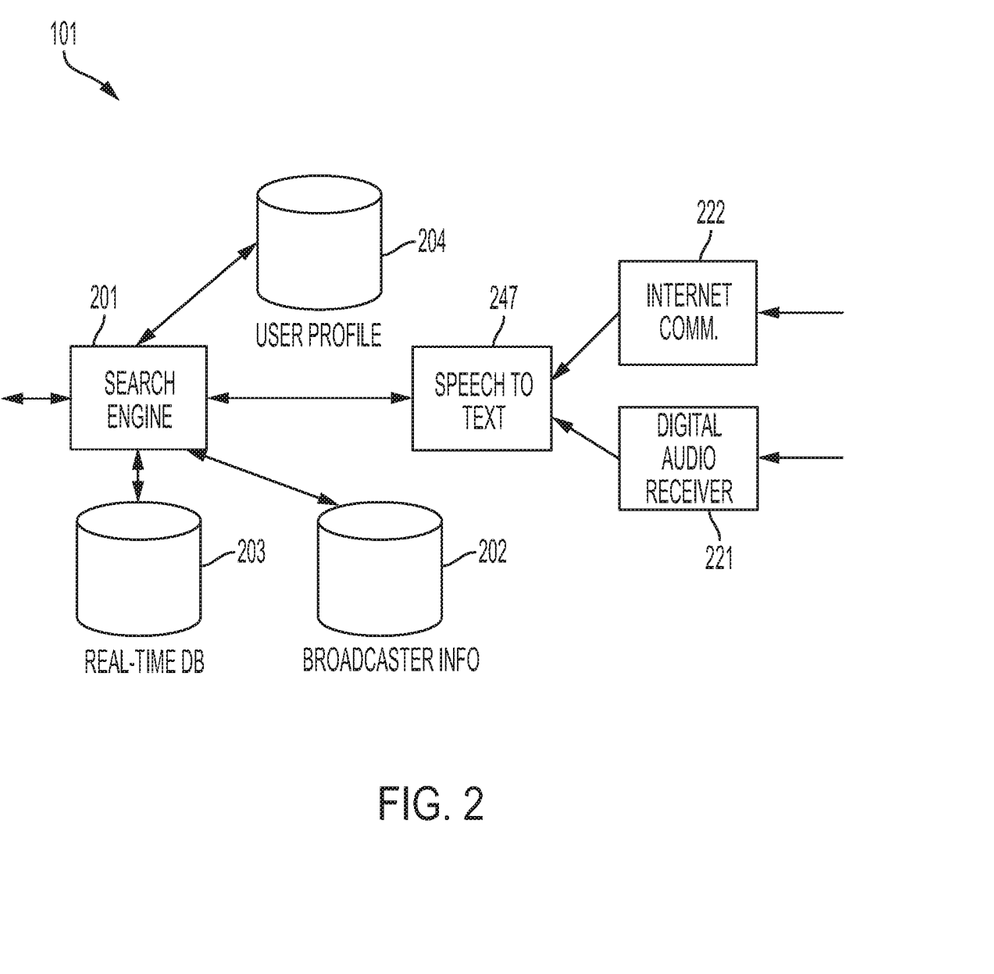
FIG. 2 is a block diagram that shows various devices and systems that a digital audio stream search and presentation system may include.

FIG. 2 illustrates example components of the media search and presentation service 101. The core of the service 101 is a search engine 201, which includes one or more processors and programming instructions that are configured to cause the service to receive search requests, analyze audio content segments, and identify segments (and the segments' associated sources) that are responsive to the requests. These features will be discussed in more detail below. The service 101 will include a digital audio receiver 221 and/or communication network receiver 222 as were described in FIG. 1 above, as well as a speech-to-text engine 247 that includes one or more processors and programming instructions that are configured to instruct the engine to receive audio streams from selected audio sources, analyze the streams in real time as they are received, and convert the stream's content into text. The speech-to-text engine 247 may include applications that receive streams from the remote sources, such as APIs, browsers, media players and/or other applications. The speech-to-text engine 247 may perform its speech-to-text conversion internally, or it may incorporate functions of now or hereafter available third party speech-to-text services such as Google Cloud Speech-to-Text, Amazon Polly, Microsoft Azure and/or IBM's Watson, using an API or other mechanism to call the third party services. Alternatively, the third party content provider itself may provide the text segment for the service to use, in which case the service will not need to convert the segment to text format.

The service 101 may temporarily store the text segments generated by the speech-to-text engine 247 in a real-time data store 203 for use by the search engine 201. Each text segment may be a single word, or a group of words corresponding a single (typically very short) time period or other word grouping. Optionally, the system may store a sequential series of one or more text segments. If so, saving the text for each segment to the data store may include appending the newly-received text segment to the stored text and deleting an oldest portion of the stored text from the data store. Optionally, deleting the oldest portion may happen only if the new text segment's size has a size that exceeds a threshold, if the size of all text segments stored for the source exceeds a threshold, or if the oldest segment is older than a threshold age. As previously noted, while the system may temporarily store text segments, it may not need to store any audio files or audio recordings of the streamed audio content.

As previously noted, the service 101 also may include a data store of content provider information 202 that it can use to receive audio content streams. The service 101 also may include a user profile data store 204 in which the system stores profile information for users of client devices, such as usernames and keys or other access credential verification mechanisms for users, historical usage data (such as previous search terms, and previous streams accessed), presets (i.e., saved searches and/or favorites), and other profile data.

Figure 3:
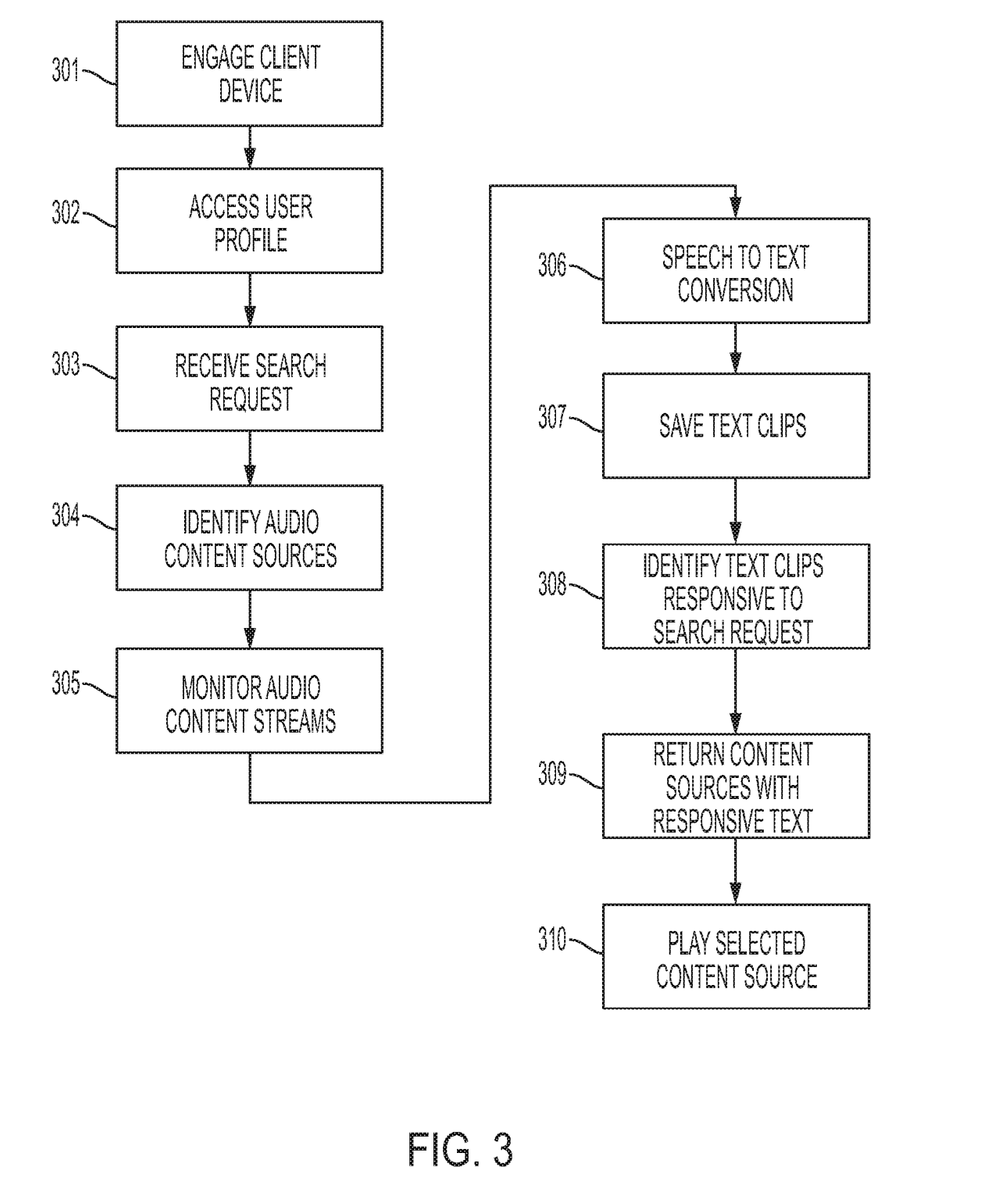
FIG. 3 is a block diagram that illustrates various processes that may be followed in certain embodiments.

FIG. 3 is a flow diagram illustrating how a media search and presentation service may operate. The service will start by engaging with a client device 301 when a user of the client device opens a dedicated app for the service, or if the user points a browser or other application to a website associated with the service. The service will receive user credentials for the user and use the credentials to access a user profile for the user 302. The user profile may include previous searches, saved searches (such as presets or favorites), and/or information that enables the service to interact with one or more sources of audio content to which the user subscribes. For example, if the user subscribes to a satellite radio service, or to a digital music service, the user profile may include login details and/or other information that enable the service to receive and deliver audio content from the audio content source to the user. The user may submit, and the system may receive, a search request 303 such as a keyword or phrase via a search field.

The service may identify any number of audio content sources 304, and it may monitor audio streams from the identified sources 305. The identification of audio content sources may be done before any searching, for example if the audio content source pre-registered with the service, if the service has an API for interaction between the service and the content source, or by the service searching the web for streams and recording Internet Protocol (IP) addresses or other digital coordinates at which the streams are located. If the user's profile included one or more sources to which the user subscribes, the system may monitor those sources (typically using an API to ensure that the service can monitor streams that are part of the user' subscription) when a user submits a search request. Optionally, a content provider may use a broadcaster interface of the application or website to direct an audio content stream to the service. The system will monitor each audio stream 305 to receive content from each audio stream as it is transmitted by the audio stream's source.

For each of the audio streams, when monitoring the stream the system will use a speech-to-text converter to capture a sequence of speech-to-text segments 306 of the audio stream. Each text segment will be a time-limited segment in that it will correspond to a limited duration snippet of the audio stream, such as 1 second, 5 seconds, 30 seconds, 1 minute, 3 minutes, 5 minutes, or another time period. The system will process snippets of audio in the sequence in real time as the audio is received to identify the words spoken or sung in each snippet to text to yield a text segment. As noted above, the system may not need to store any audio segment that it receives. However, the system may store the resulting text segment in a data store for a limited time period, such as a time period equal to the duration of the segment 307. The system will also store, in the data store as metadata or otherwise in association with the text segment, identifying information about the source of the text segment. The system will then compare the search request to the stored text segments to determine which text segments include information that matches or that corresponds to the search request 308. The request may be an exact match in which the words of the request match the words that are included in the segment, or the system may use any suitable semantic search method to find semantically similar matches such as spelling and/or text variations. (For example, for a search on "Lakers" the system may return audio segments that include the name of the Los Angeles National Basketball Association team, or related content such as one or more of the team's players, the facility in which the team plays, team management or owners, or the like.)

Figure 4:
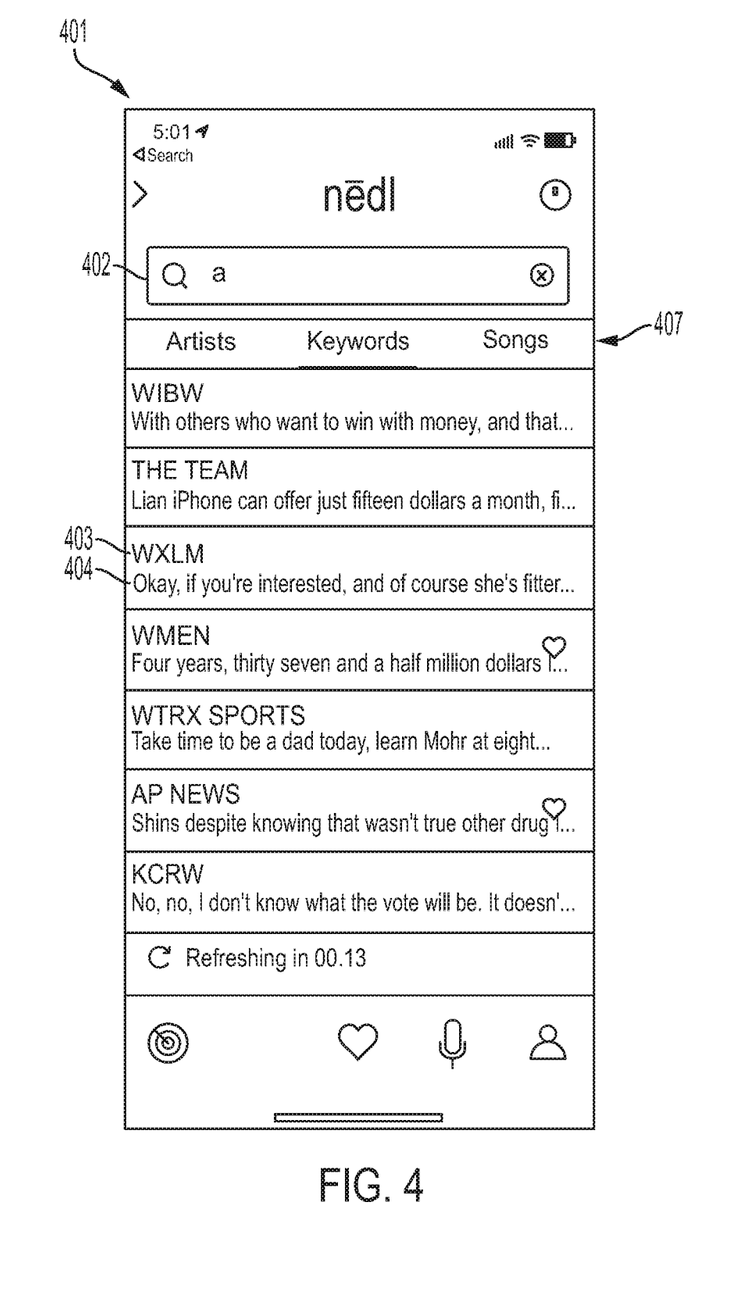
FIGS. 4-7 illustrate example features that a user interface of a digital audio stream search and presentation service's client-facing application may provide.

The system will return a list or other structured response that identifies one or more content sources whose text segments correspond to the search request 309. FIG. 4 shows an example user interface 401 with a search field 402 and a list of user-selectable content sources 403. With each content source, the user interface may display a snippet 404 which is some or all of the text segment that includes the text that is responsive to the search request. Optionally, the system may modify the list in real time as the user adds letters to or deletes letters from the search request, or it may wait for the user to stop typing for a threshold period of time, or it may wait for the user to enter a prompt indicating that the entry is complete. An example of this is shown by comparing FIG. 4 (in which the letter "a" was received in the search box 401), with FIG. 5 (in which the full name of the artist "Aretha Franklin" was received in the search box 501).

Figure 5:
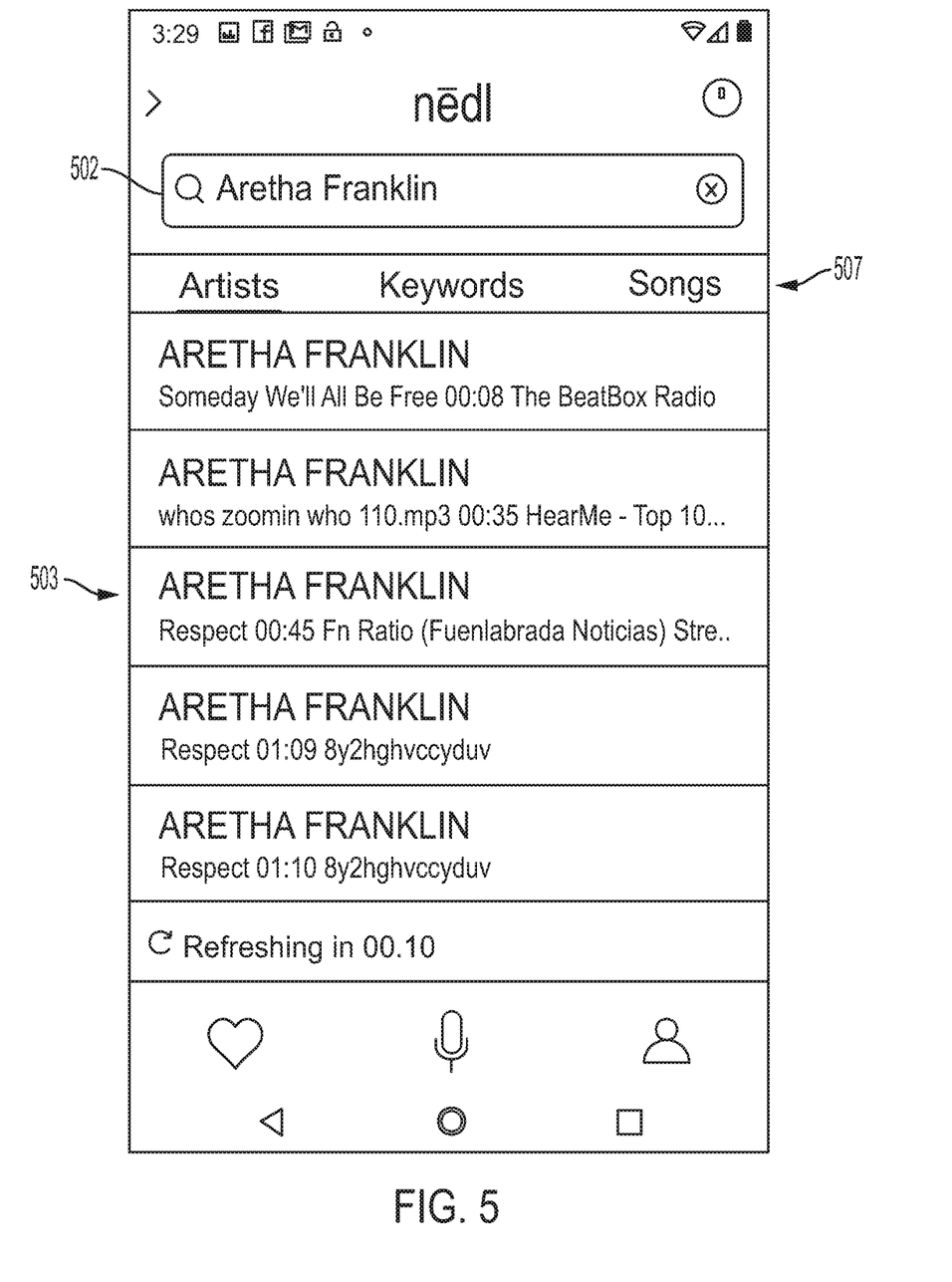

In addition, the system may present a user-selectable set of list categories which enables the user to select the categorical information that the list will show. In the examples of FIGS. 4 and 5, for a music search service the categories 407, 507 may include artist keyword and songs. In the example of FIG. 4, the category is "keyword" and the resulting content sources 403 are listed with a portion of the text segment that includes the keywords that are associated with the search. In the example of FIG. 5, the category is "artist" and the resulting content sources 503 are listed by artist, with the song and time elapsed in the artist's song that the source is playing shown.

The system may order the results (i.e., the list of sources 403, 503) on the display using any suitable ordering scheme. For example, as a default the system may present the list of sources such that the source that most recently included content relevant to the search request is listed first, the source that next most recently included content relevant to the search request is listed second, and so on. In the example of FIG. 5, the results 503 are ordered in which the results are ranged by shortest time elapsed (with the shortest time listed first), so that the user can select a song or other content stream that is nearest to its starting time. Or, if the user has favorite content sources, or if the user has identified sources to which the user subscribes, the system may list those sources first. The system may also consider source ratings submitted by other users, or most popular sources, and list those sources higher. Or, the system may use any suitable algorithm to rank the results, such as an algorithm that considers factors such as which source spoke the responsive content most frequently, which sources are the user's favorites, which sources are rated more highly by other users, which sources are more popular, or other criteria. The algorithm also may consider factors such as: (i) recency of time at which the one or more words that correspond to the one or more keywords were received in the audio stream to which the text segment corresponds; (ii) a number of times in which a component of the search result appears in the text segment; and/or (iii) a prominence of a component of the search result in the text segment, wherein the prominence comprises a measure of the component of the search result with respect to a total measure of the text segment, or a position of the component search result with respect to the text segment. Optionally, the electronic device may display the results in ranked order, or it may select and display results having a highest ranking, or only rankings that exceed a threshold value. The system also may include one or more results that are sponsored results, that are "trending" favorite results from other users, curated results, or other results. The selection and/or ordering of results also may consider the geographic location of the device (as detected from a GPS sensor or network connection identifier) and select results that are closest to or within a limited area (i.e., a geofence) from the device.

Figure 6:
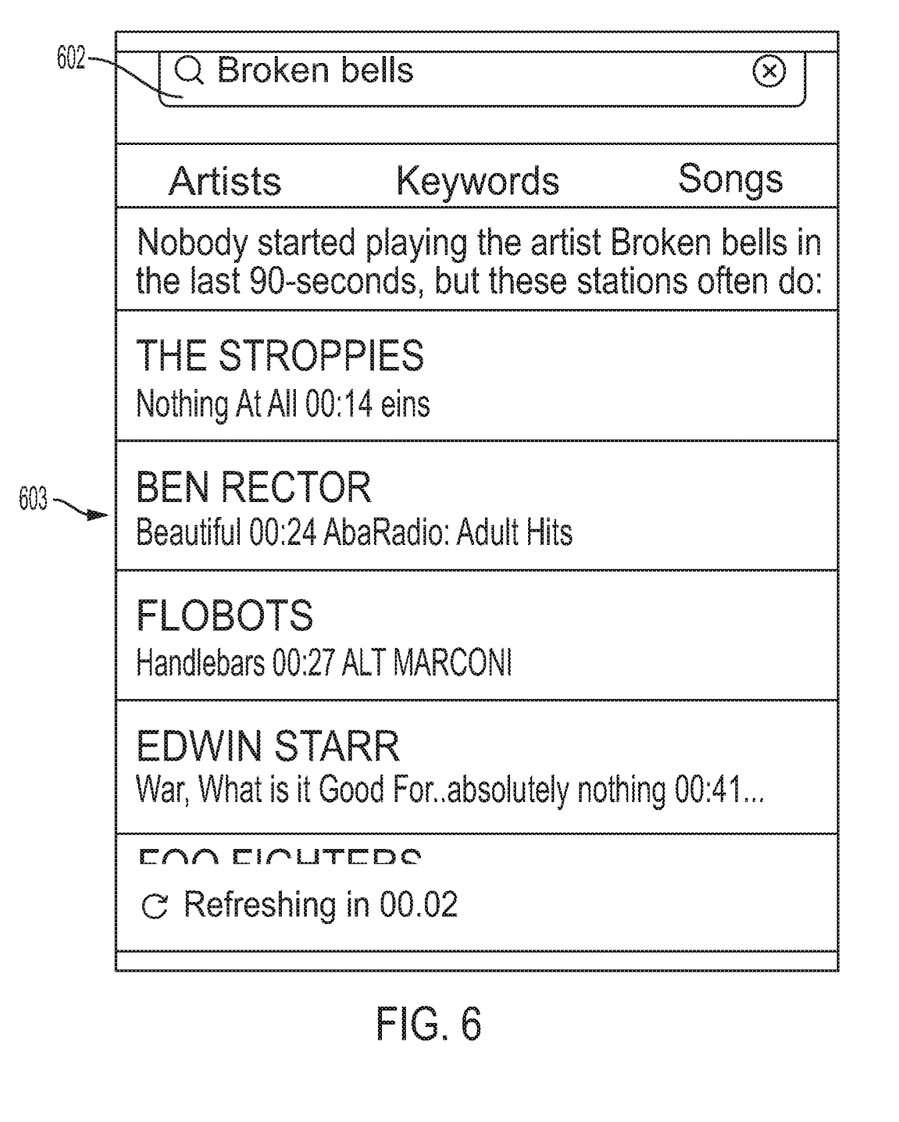

If the system finds no results that are responsive to the search (for example, if no station's text segments include content relevant to the search), the system may select and display a list of alternate sources that are known to have played audio content in the past that would be relevant to the search results. For example, in the example of FIG. 6, if the search field 602 entry was the name of an artist whose music is not being played by any monitored stream at the time, the system may present a list of candidate streams 603 that most frequently play the artist, or that played the artist most recently, or that play artists having known characteristics that are similar to those of the requested artist.

As an alternative to (or in addition to) outputting a graphical user interface and displaying the results, the system may present the results via an audio output, using a text-to-speech generator or a set of recordings to generate the result that will be output in spoken word format.

Figure 7:
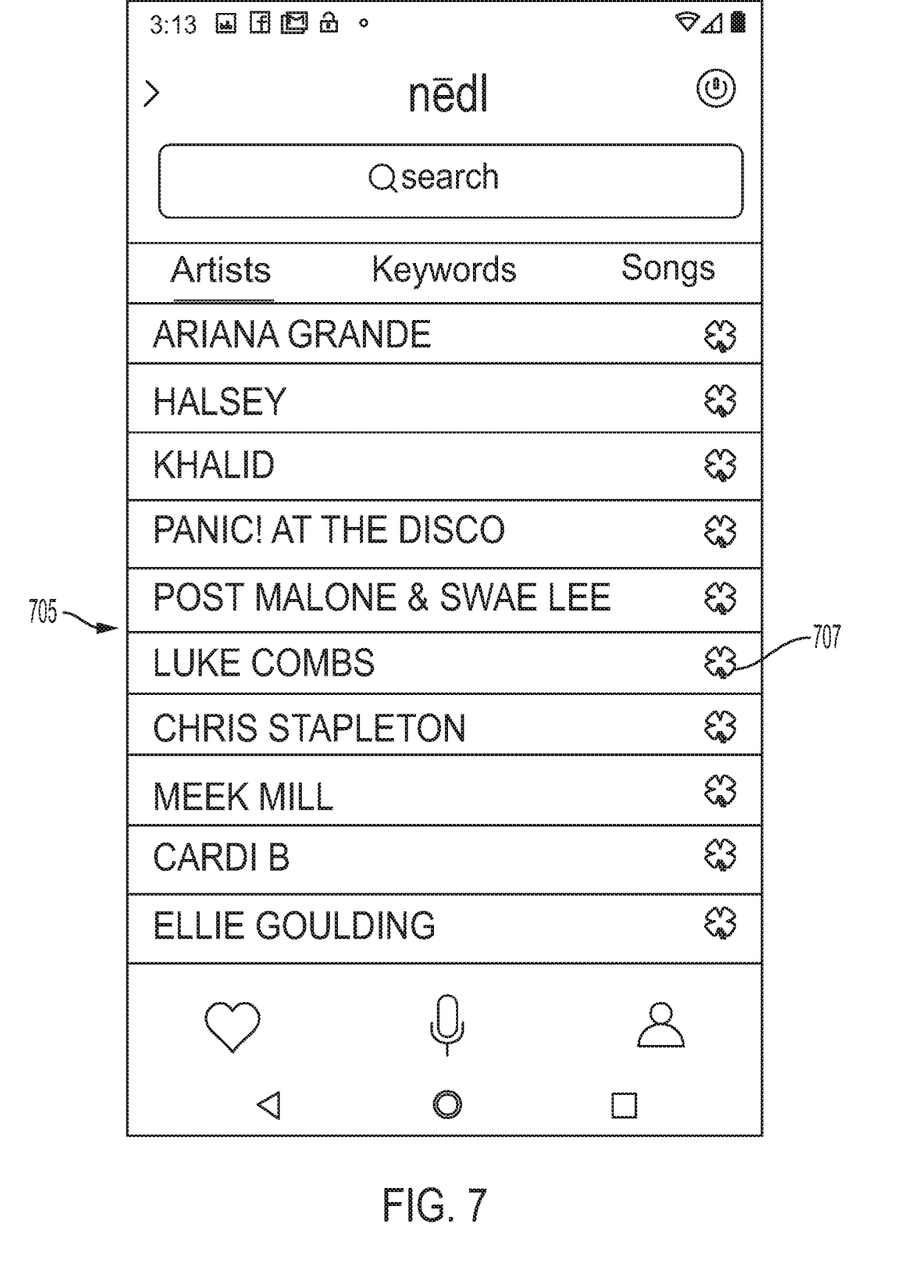

Referring to FIG. 7, in addition to displaying potential content sources, before the user enters anything into the search field the system may present the user with a list of candidate searches 703 for the user to consider and select without entering a free-form response. The candidate searches 703 may be "presets" that are saved by the user in the user's profile for easy re-entry, the user's most frequent searches, the user's most recent searches, searches performed most frequently by all users of the service or by a subset of users having one or more characteristics that are similar to the user to whom the list is presented, or by other criteria. The randomization function may be weighted to give favor to sources that meet various criteria such as sources having characteristics that match user preference data, sources having a location that is proximate to the user, sponsored results, or various other parameters. When a user selects a preset search, the system may then perform a search of content source text segments and present the results as shown above. In addition, the system may output a user-selectable prompt 707 by which the user can instruct the system to bypass presentation of the search results and directly go to (and play) the highest ranked result.

Returning to FIG. 3, the system may then receive a user selection of the content source (such as by receiving a touch of the source on a touch screen interface, or by an audio input, or by seeing with gesture recognition technology that the user has performed a gesture that selects a source), and it may then cause the digital stream of the selected content source to be played 310, either by presenting the content source via a media player application or by opening a separate media application that is associated with the selected content source. Optionally, the user may select an option that permits the system to select and play a source. If so, the system may use any suitable algorithm to consider which source to play, using criteria such as those discussed above in the context of FIG. 4 and/or other criteria, or randomly as will be discussed below. In response to receiving a selection of a content source, the system will cause a media player application of the client device to access the audio content source and cause an audio output of the client device to play audio content that the audio content source is playing at the time of the connecting, thus in real time.

Optionally, the electronic device may display the results in ranked order, or it may select and display results having a highest ranking, or it may only display rankings that exceed a threshold value. To enable this, the system may rank the text segments in the search results by relevance based on one or more of the following: (i) a number of times in which a component of the search result appears in the text segment; or (ii) a prominence in the text segment of a component of the search result in the text segment, wherein the prominence comprises a measure of the component of the search result with respect to a total measure of the text segment, or a position of the component search result with respect to the text segment.

This, the system described above may implement a method or process for real-time key word flagging and/or speech detection so that a consumer may enter a key word or phrase into application user interface of an electronic device to search real-time audio streams and discover who and where the topic of the key word or phrase is being discussed in real-time.

In embodiments where a broadcasting and/or recording entity's electronic device performs or orders the speech-to-text conversion, the processes described in this document can speed processing time and reduce bandwidth, processing and memory requirements of the search service that hosts the database. For example, a radio station DJ can open the app on his or her local electronic device while on the air so that the app can ingest the speech using the mobile device's speech to text capability (optionally using a remote conversion service) and then upload that text into the database to match it up to the radio stream that is in the database when a user searches it to daily processing if the system did not do this at the local handset or other local device.

Figure 8:
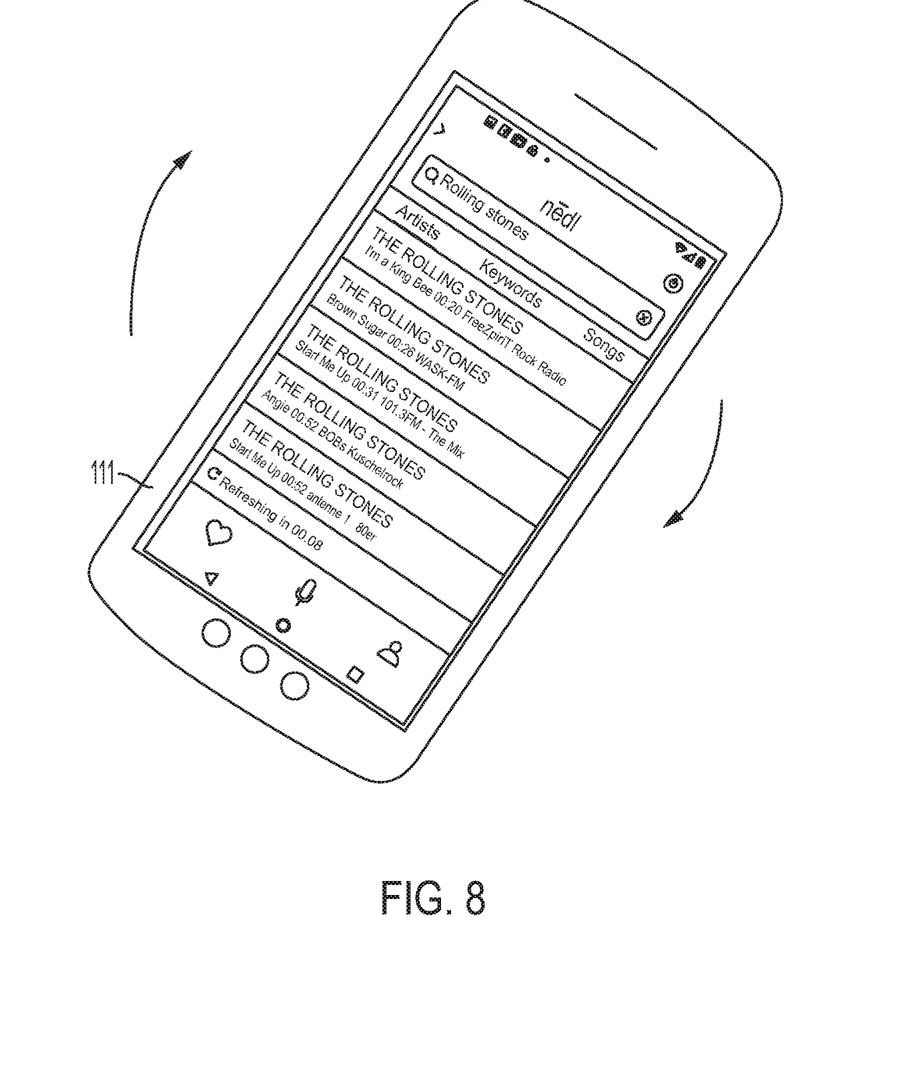
FIG. 8 illustrates an example method by which a user may select a candidate audio content source to be played on a client device.

As described above, the client device's application detect a user selection of a candidate content source or present search using various input detection methods, such as detecting that a touch screen or keypad has been pressed, receiving a spoken audio input, or using a camera of the client device to detect one or more gestures of the user. FIG. 8 illustrates an alternate input method by which a user may instruct the device to make a random selection of a set of candidate content sources and/or presets. As shown in FIG. 8, the application may include programming instructions for a "spin function" that will randomly select a content source or preset upon receiving a signal from a motion sensor of the device (such as a gyroscope or inertial measurement unit) that the device 111 has been spun so that it rotates by at least a threshold speed (such as a minimum number of rotations per minute). Upon detecting that the device 111 has been spun, the application may apply a randomization function to select and play any of the listed candidate content sources, or to select and apply a random preset search term. The system may automatically play the randomized content source, or automatically apply the randomized search term, or it may present the randomized result to the user and wait for the user to enter a confirmation before playing or applying the result. As an alternative to actually spinning the device, the application may include a function that enables the user to select the randomization function via other input means, such as an audio input (e.g., with a spoken instruction to "spin my device" or "randomly select a station"). In some embodiments, if the user has not yet performed any search, the system may simply apply the randomization function to randomly select and play a content source from all available content sources, optionally applying weights as described above.

Figure 9:
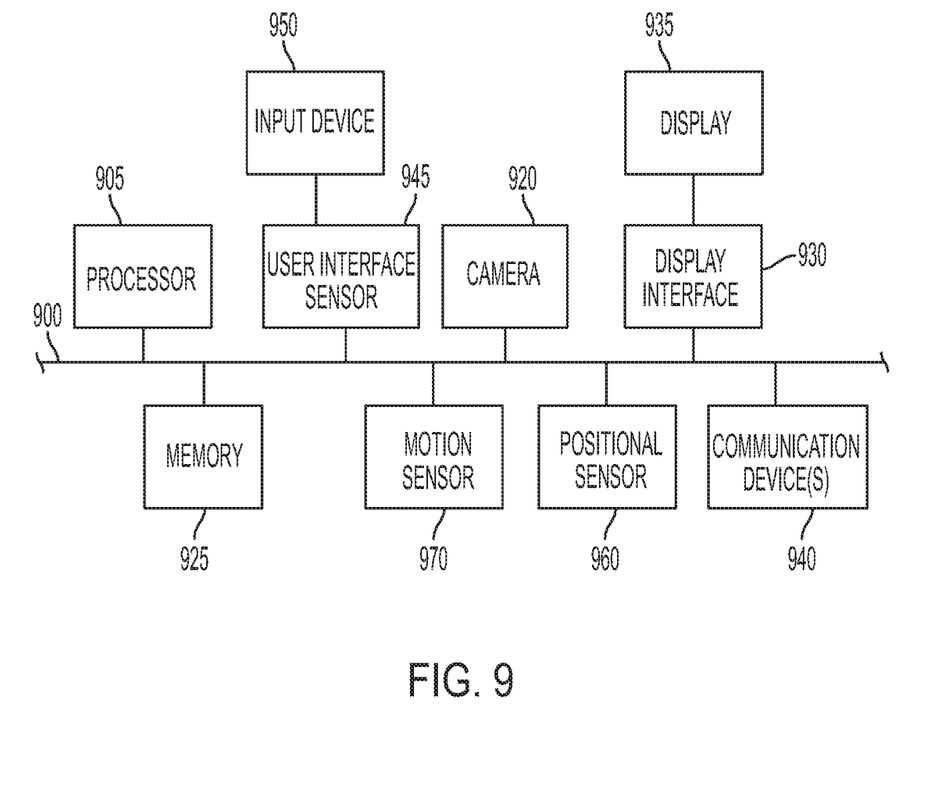
FIG. 9 describes example elements of an electronic device that may be used in various components of a digital audio stream search and presentation system.

FIG. 9 depicts an example of internal hardware that may be included in any of the electronic components of the system, such as a user's client device, the server that provides the service, or a local or remote computing device in the system. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored.

An optional display interface 930 may permit information from the bus 900 to be displayed on a display device 935 in visual, graphic or alphanumeric format. An audio interface and audio output (such as a speaker) also may be provided. Communication with external devices may occur using various communication devices 940 such as a wireless antenna, an RFID tag and/or short-range or near-field communication transceiver, each of which may optionally communicatively connect with other components of the device via one or more communication system. The communication device 940 may be configured to be communicatively connected to a communications network, such as the Internet, a local area network or a cellular telephone data network.

The hardware may also include a user interface sensor 945 that allows for receipt of data from input devices 950 such as a keyboard, a mouse, a joystick, a touchscreen, a touch pad, a remote control, a pointing device and/or microphone. Digital image frames also may be received from a camera 920 that can capture video and/or still images. The system also may include a positional sensor 960 and/or motion sensor 970 to detect position and movement of the device. Examples of motion sensors 970 include gyroscopes, accelerometers and inertial measurement units as described above in the discussion of FIG. 8. Examples of positional sensors 980 include a global positioning system (GPS) sensor device that receives positional data from an external GPS network.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants, radios, devices equipped with digital audio capture (DAC) cards such as recording equipment and microphone-equipped devices, audio and/or video encoders, and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion below, a client device, server device, virtual machine or container may be referred to simply as a "device" for brevity. Additional elements that may be included in electronic devices were discussed above in the context of FIG. 9.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

As used in this document, the terms "digital media service," "streaming media service," "broadcast service" and related or similar terms refer to systems, including transmission hardware and one or more non-transitory data storage media, that are configured to transmit digital content to one or more users of the service over a communications network such as the Internet, a wireless data network such as a cellular network or a broadband wireless network, a digital television broadcast channel or a cable television service in digital streaming format for real-time consumption by receiving electronic devices. Digital content streamed by such services will, at a minimum, include an audio component. Optionally, the digital content also may include a video component and/or metadata such as closed-captions, radio data system (RDS) data, and other data components such as those included in the ATSC 3.0 broadcast transmission standard. This document may use the term "digital audio stream" to refer to any digital content that is transmitted for consumption by subscribers and/or the public, and that includes at least an audio component.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of providing real-time searching of audio streams, comprising, by a digital media search and presentation service:
   receiving a plurality of audio streams from a plurality of audio content sources;
   converting each of the audio streams, in real-time, as the audio streams are received, into one or more text segments, wherein each text segment corresponds to a snippet of its corresponding audio stream and includes words spoken or sung in the snippet, and wherein the converting does not include storing or recording any of the audio streams;
   saving each text segment to a data store of real-time content;
   receiving, from a client device, a search request comprising one or more keywords;
   accessing the data store of real-time content to identify text segments that include one or more words that correspond to the one or more keywords;
   selecting one or more of the text segments as candidate search results;
   causing the client device to output one or more user-selectable fields, each of which includes information corresponding to each of the selected text segments in a user-selectable interface by which the user may select the audio content sources for each of the selected text segments;
   receiving a selection of one of the user-selectable fields; and
   in response to receiving a selection of one of the user-selectable fields, causing a media player of the client device to access the audio content source and receive audio content that the audio content source is transmitting, in real-time, and cause an audio output of the client device to play the audio content, in real-time, at the time the audio content source is accessed.

2. The method of claim 1, wherein the converting each of the audio streams comprises:
   receiving the audio stream;
   processing the snippet of the audio stream with a speech-to-text converter; and
   saving output from the speech-to-text converter as the text segment.

3. The method of claim 1, further comprising:
   continuing to convert each of the audio streams into a new text segment, wherein each new text segment corresponds to a new snippet of its corresponding audio stream; and
   for each of the audio streams, saving each new text segment to the data store of real-time content and, when doing so, deleting one or more previously-saved text segments for the audio stream.

4. The method of claim 1, wherein receiving the plurality of audio streams from a plurality of audio content sources comprises:
   receiving one or more audio streams from a digital streaming source via a communication network; and
   receiving one or more audio streams from an over-the-air broadcasting source.

5. The method of claim 1, wherein receiving the selection of one of the user-selectable fields comprises detecting a touch, a spoken word, or a gesture of a user of the client device.

6. The method of claim 1, wherein receiving the selection of one of the user-selectable fields comprises:
   detecting that a user of the client device has requested a random selection; and
   applying a randomization function to randomly select one of the user-selectable fields.

7. The method of claim 6, wherein detecting that the user of the client device has requested a random selection comprises receiving a signal from a motion sensor of the client device indicating that the client device has been spun by at least a threshold speed.

8. The method of claim 1, wherein:
   the selecting one or more of the text segments as candidate search results comprises ranking the text segments by relevance based on one or more of the following:
      recency of time at which the one or more words that correspond to the one or more keywords were received in the audio stream to which the text segment corresponds,
      a number of times in which a component of the search request appears in the text segment, or
      a prominence in the text segment of component of the search request; and
   causing the client device to output the one or more user-selectable fields comprises ordering the user-selectable fields according to the ranking of the text segments that correspond to the user-selectable fields.

9. The method of claim 1, wherein:
   the selecting one or more of the text segments as candidate search results comprises ranking the text segments by relevance based on one or more of the following:
      geographic proximity of the audio content source from which the text segment was derived to the client device, or
      characteristics of the audio content source corresponding to user profile data for a user of the client device; and
   causing the client device to output the one or more user-selectable fields comprises ordering the user-selectable fields according to the ranking of the text segments that correspond to the user-selectable fields.

10. The method of claim 1, wherein the receiving the search request includes receiving the search request using a user interface of the client device, the user interface including one or more of the following:
   a keyboard; a mouse; a joystick; a touchscreen; a touch pad; a remote control; a pointing device; or a microphone.

11. A real-time audio stream selection and presentation system, comprising:
   a service comprising a processor, a receiver, a data store of real-time content, a client device, and programming instructions that, when executed, will cause the service to:
      receive, via the receiver, a plurality of audio streams from a plurality of audio content sources,
      convert each of the audio streams, in real-time as the audio stream is received, into one or more text segments, wherein each text segment corresponds to a snippet of its corresponding audio stream and includes words spoken or sung in the snippet, wherein the instructions to convert each of the audio streams does not comprise instructions to store or record any of the audio streams,
      save each text segment to the data store of real-time content;
      receive, from a client device, a search request comprising one or more keywords,
      access the data store of real-time content to identify text segments that include one or more words that correspond to the one or more keywords,
      select one or more of the text segments as candidate search results, and
      send the candidate search results to the client device; and
   an application installed on the client device and that comprises additional programming instructions to:
      cause the client device to output one or more user-selectable fields, each of which includes information corresponding to each of the selected text segments in a user-selectable interface by which the user may select the audio content sources for each of the selected text segments,
      receive a selection of one of the user-selectable fields, and
      in response to receiving a selection of one of the user-selectable fields, cause a media player of the client device to access the audio content source and receive audio content that the audio content source is transmitting, in real-time, and cause an audio output of the client device to play the audio content, in real-time, at the time the audio content source is accessed.

12. The system of claim 11, wherein the instructions to convert each of the audio streams comprise instructions to:
   receive the audio stream;
   process the snippet of the audio stream with a speech-to-text converter; and
   save output from the speech-to-text converter to the real-time data store as the text segment.

13. The system of claim 11, further comprising additional instructions to cause the service to:
   continue to convert each of the audio streams into a new text segment, wherein each new text segment corresponds to a new snippet of its corresponding audio stream; and
   for each of the audio streams, save each new text segment to the data store of real-time content and, when doing so, delete one or more previously-saved text segments for the audio stream.

14. The system of claim 11, wherein the instructions to receive the plurality of audio streams from a plurality of audio content sources comprise instructions to:
   receive one or more audio streams from a digital streaming source via a communication network via a first receiver; and
   receive one or more audio streams from an over-the-air broadcasting source via a second receiver.

15. The system of claim 11, wherein the instructions to receive the selection of one of the user-selectable fields comprise instructions to detect a touch, a spoken word, or a gesture of a user of the client device.

16. The system of claim 11, wherein the instructions to receive the selection of one of the user-selectable fields comprise instructions to:
   detect that a user of the client device has requested a random selection; and
   apply a randomization function to randomly select one of the user-selectable fields.

17. The system of claim 16, wherein the instructions to detect that the user of the client device has requested a random selection comprise instructions to do so upon receipt of a signal from a motion sensor of the client device indicating that the client device has been spun by at least a threshold speed.

18. The system of claim 11, wherein:
   the instructions to select one or more of the text segments as candidate search results comprise instructions to rank the text segments by relevance based on one or more of the following:
      recency of time at which the one or more words that correspond to the one or more keywords were received in the audio stream to which the text segment corresponds,
      a number of times in which a component of the search request appears in the text segment, or
      a prominence in the text segment of component of the search request; and
   the instructions to cause the client device to output the one or more user-selectable fields comprise instructions to order the user-selectable fields according to the ranking of the text segments that correspond to the user-selectable fields.

19. The system of claim 11, wherein:
   the instructions to select one or more of the text segments as candidate search results comprises instructions to rank the candidate search results by relevance based on one or more of the following:
      geographic proximity of the audio content source from which the text segment was derived to the client device, or
      characteristics of the audio content source corresponding to user profile data for a user of the client device; and
   the instructions to cause the client device to output the one or more user-selectable fields comprise instructions to order the user-selectable fields according to the ranking of the text segments that correspond to the user-selectable fields.

20. A digital media search and presentation service for real-time searching of audio streams, the digital media search and presentation service comprising:

a memory device communicatively, connected to a processor, containing programming instructions that, when executed by the processor, will cause the real-time audio stream selection and presentation service to:
  receive, via the receiver, a plurality of audio streams from a plurality of audio content sources via the receiver,
  convert each of the audio streams into one or more text segments, wherein each text segment corresponds to a snippet of its corresponding audio stream and includes words spoken or sung in the snippet, wherein the instructions to convert each of the audio streams into a text segment does not comprise instructions to store or record any of the audio streams,
  save each text segment to the data store of real-time content,
  receive, from a client device, a search request comprising one or more keywords,
  access the data store of real-time content to identify text segments that include one or more words that correspond to the one or more keywords,
  select one or more of the text segments as candidate search results, and
  send the candidate search results to the client device; and
an application installed on a client device with additional programming instructions to:
  cause the client device to output one or more user-selectable fields, each of which includes information corresponding to each of the selected text segments in a user-selectable interface by which the user may select the audio content sources for each of the selected text segments,
  receive a selection of one of the user-selectable fields, and
  in response to receiving a selection of one of the user-selectable fields, cause a media player of the client device to access the audio content source and receive audio content that the audio content source is transmitting, in real-time, and cause an audio output of the client device to play the audio content, in real-time, at the time the audio content source is accessed.

21. The digital media search and presentation service of claim 20, wherein the instructions to convert each of the audio streams into a text segment comprise instructions to:
  receive the audio stream;
  process the snippet of the audio stream with a speech-to-text converter;
  save output from the speech-to-text converter to the real-time data store as the text segment;
  continue to convert each of the audio streams into a new text segment, each of which corresponds to a new snippet of its corresponding audio stream; and
  for each of the audio streams, save each new text segment to the data store of real-time content and, when doing so, delete one or more previously-saved text segments for the audio stream.

* * * * *